United States Patent
Dautartas

(10) Patent No.: US 6,408,120 B1
(45) Date of Patent: Jun. 18, 2002

(54) FIBER ARRAY ALIGNMENT ARRANGEMENT

(75) Inventor: Mindaugas Fernand Dautartas, Alburtis, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/420,753

(22) Filed: Oct. 20, 1999

(51) Int. Cl.[7] .................................................. G02B 6/26
(52) U.S. Cl. ............................. 385/52; 385/18; 385/19; 385/35
(58) Field of Search ............................... 385/31–33, 35, 385/52, 18, 19

(56) References Cited

U.S. PATENT DOCUMENTS

| | | |
|---|---|---|
| 4,730,198 A | 3/1988 | Brown et al. |
| 5,259,054 A | 11/1993 | Benzoni et al. |
| 5,559,915 A | 9/1996 | Deveau |
| 5,647,044 A | 7/1997 | Basavanhally et al. |
| 5,748,812 A | 5/1998 | Buchin |
| 5,761,350 A | 6/1998 | Koh |
| 5,867,297 A | 2/1999 | Kiang et al. |
| 5,960,133 A * | 9/1999 | Tomlinson .................... 385/18 |

* cited by examiner

Primary Examiner—Darren Schuberg
Assistant Examiner—Fayez Assai
(74) Attorney, Agent, or Firm—Wendy W. Koba

(57) ABSTRACT

A fiber array subassembly for use with a two-dimension MEMS mirror array comprises a plurality of separate substrate elements (for example, silicon substrates) stacked one upon the other and formed to include via holes that, upon stacking, form the fiber array apertures. By controlling the via location on each substrate element, precise registration between the location of each optical device in the array (such as mirror elements in a MEMS arrangement) and the communication fibers can be achieved. The stack of substrates may also be formed to including a "mechanical stop" for each fiber, ensuring a precise separation between each fiber endface and its associated lensing elements.

6 Claims, 3 Drawing Sheets

FIBER ARRAY ALIGNMENT ARRANGEMENT

TECHNICAL FIELD

The present invention relates to a fiber array alignment arrangement and, more particularly, to a stacked array structure for securing a plurality of optical fibers in optical alignment with an associated microelectronic mirror switch (MEMS) arrangement.

BACKGROUND OF THE INVENTION

Optical integrated circuits (OICs) are increasingly being used to implement optical devices including 1×N splitters, switches, wave division multiplexers (WDMs), and other optical devices, primarily due to the capability through optical device integration to obtain devices requiring relatively precise component configuration. Also, OICs generally have a more compact size and are more reliable and durable than discrete optical devices. One particular class of such OICs includes high-speed optical switches having a digital operating mode in which the apparatus rapidly switches a light beam. When used to switch a light beam between two optical paths, the high-speed optical switch can be used for generating a light beam having rapidly alternating wavelengths or spectral bands, primarily for the purpose of alternating or interleaving the excitation or illumination energy delivered to a target. In addition to alternating the spectral content of the light beam, the high-speed optical switch is also capable of operating as a shuttering system to cut off the light beam completely. Silicon-surface micromachining technology has been used to fabricate mirrors associated with such high-speed optical switches. In particular, optical microeletromechanical systems (MEMS) have been implemented with movable micro-mirrors.

Often, devices such as a MEMS optical switch are used in conjunction with an array of optical fibers external to the MEMS structure, that transmit optical signals to, and receive optical signals from, the MEMS optical switch. In its optimum arrangement, the MEMS switch is a two-dimensional array structure and requires accurate alignment of a two-dimensional fiber array to the MEMS substrate. In the past, separate fibers have been engaged in separate fiber ferrules, with the ferrules "bundled" together to form the fiber array. Such a fiber array arrangement is problematic in terms of expense, time spent forming the arrangement and, most importantly, the ability to provide accurate alignment of each separate fiber to an associated switch array element.

Thus, a need remains in the art for an improved technique for aligning an array of optical fibers to a structure such as a MEMS optical switch.

SUMMARY OF THE INVENTION

The need remaining in the prior art is addressed by the present invention, which relates to a fiber array alignment arrangement and, more particularly, to a stacked array structure for securing an a plurality of optical fibers in optical alignment with an associated microelectronic mirror switch (MEMS) arrangement.

In accordance with the present invention, a plurality of separate substrates are stacked to form a subassembly for supporting an array of optical fibers, where each substrate is formed to include an array of apertures for holding the fibers in place. In a preferred embodiment, each substrate comprises silicon which can be etched to form the array of apertures so that the fibers will be accurately aligned with the mirror elements on an associated MEMS arrangement. In accordance with the present invention, the "top" silicon substrate of the stack can be further processed to including indentations aligned with the apertures for supporting a plurality of lens elements in alignment with the array of optical fibers.

In one embodiment of the present invention, alignment fiducials are formed on each substrate in the fiber array stack so as to provide both physical alignment between adjacent substrates (and, therefore, alignment of the fiber-supporting apertures), and a means of providing mechanical attachment between adjacent substrates.

In a preferred embodiment, one of the substrates may be processed to include a plurality of mechanical stops, each stop formed within an associated fiber aperture. The stop is used as a registration point for the endface of the associated fiber, thus ensuring that each fiber endface is properly located with respect to both its associated lens element and the MEMS arrangement.

It is an advantage of the present invention that the stack substrates may be formed utilizing any suitable material including, but not limited to, silicon, metal, an injection-molded or transfer-molded plastic.

Other and further advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
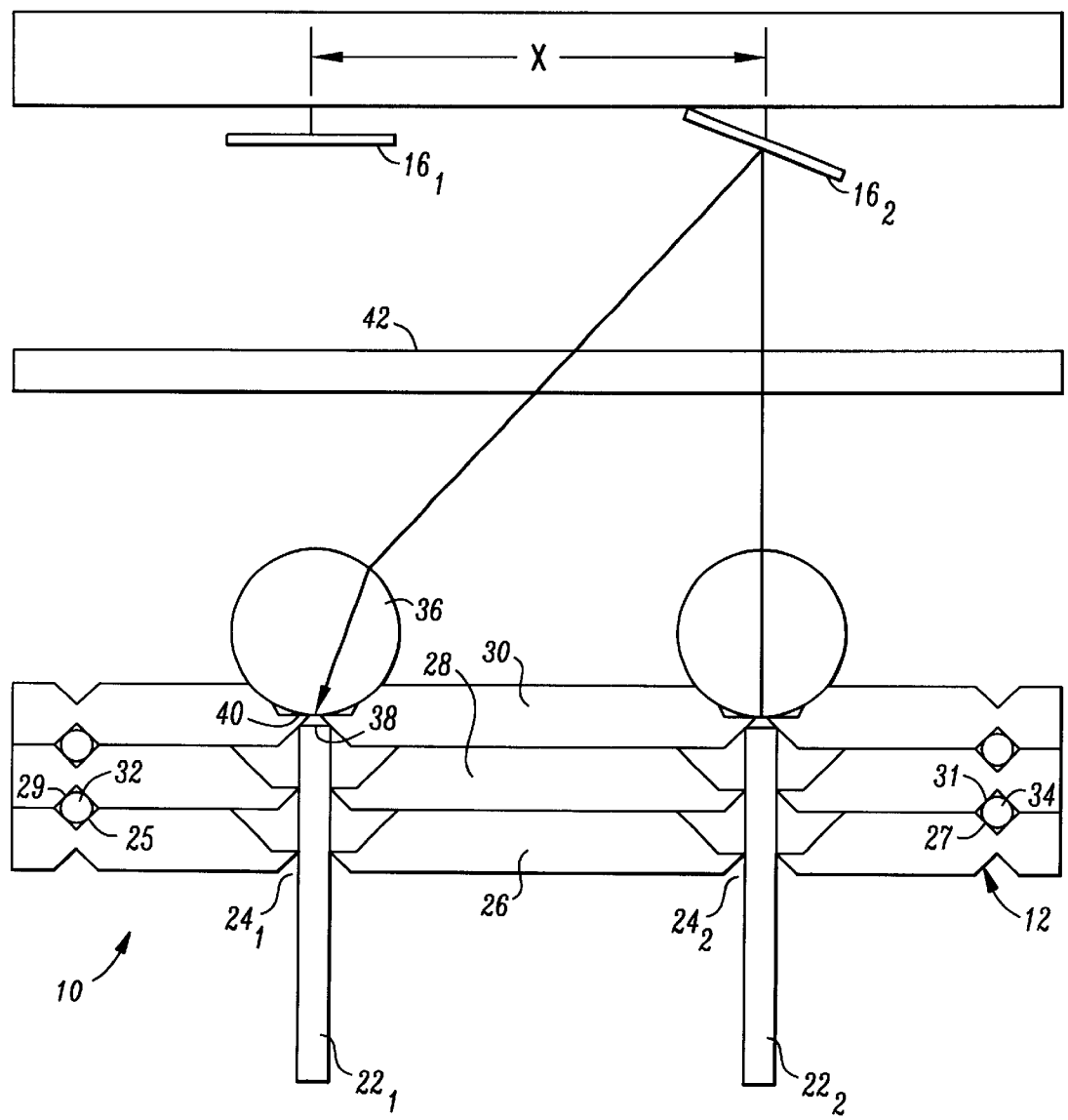
FIG. 1 contains a side view of an exemplary MEMS switch utilizing a fiber array arrangement of the present invention.

FIG. 1 illustrates an exemplary MEMS system 10 utilizing a fiber stack array arrangement 12 formed in accordance with the present invention. For the purposes of the present discussion, only a brief, overview description of the operation of a MEMS switch is required. In general, a MEMS mirror assembly 14 includes a plurality of mirror elements 16, arranged in a two-dimensional array across surface 18 of a support substrate 20. Electrode elements (not shown) are disposed on substrate 20 and activated to control the position of mirror elements 16. In the view illustrated in FIG. 1, mirror $16_1$ remains in its stationary position, while mirror $16_2$ has been tilted so that any optical signal impinging mirror $16_2$ will be directed toward a different output device. Although not depicted in this view, mirror elements 16 may also be tilted "into" and "out of" the plane of the drawing so as to couple light between other devices in the associated array.

In accordance with the arrangement of the present invention, a plurality of optical fibers 22 are used to provide input signals to, as well as couple output signals from, MEMS mirror assembly 14, where the array of fibers 22 are disposed within an array of apertures 24 formed within fiber stack arrangement 12. It is an aspect of the present invention that the pre-defined spacing between mirror elements 16 can be used to define the required location for each aperture 24, where conventional silicon processing can then be used to form the array of apertures 24 with the necessary accuracy so as to ensure alignment between fiber stack arrangement 12 and MEMS mirror assembly 14.

Referring to the arrangement of FIG. 1, fiber stack arrangement 12 is illustrated as including a set of three separate substrate elements 26, 28 and 30, where each has been separately etched to form vias (through holes), which will align upon mating of the separate substrates to form the plurality of apertures 24. It is to be noted that the fiber stack of the present invention may be formed to include any suitable number of separate substrate elements, where a set of at least three has been found to be a preferable alternative. Accurate alignment and registration between substrates 26, 28 and 30 can be accomplished, in accordance with the present invention, by including alignment fiducials on each of the substrates. As shown in FIG. 1, substrate 26 may be formed to include a pair of pyramidal detents 25, 27 and substrate 28 formed to include a similarly disposed pair of pyramidal detents 29, 31. Upon joining of these substrates, a pair of alignments spheres 32, 34 are disposed between each mated pair of detents. The alignment of the detents and the inclusion of the spheres between the detents serve to provide both physical alignment of substrates 26 and 28, as well as mechanical attachment of the pair of substrates. A similar set of pyramidal detents and alignment spheres are used to align and join substrate 28 to substrate 30. Various other alignment arrangements may be used; the pyramidal detents and alignments spheres should be considered as exemplary only. For example, interlocking V-grooves and ridges may be formed on adjacent substrates and similarly used to provide both physical alignment and mechanical attachment.

In the switch arrangement of the present invention, a separate spherical lens element 36 is disposed in each aperture 24 in proximity to the endface 38 of each fiber 22. The precise separation between fiber endface 38 and spherical lens element 36 can be controlled, in a preferred embodiment of the present invention, by forming the appropriate substrate element to include a mechanical stop 40 for controlling the position of endface 38, as shown in FIG. 1. The formation of such a mechanical stop is discussed in detail below in association with FIGS. 3–7. The optics of the exemplary MEMS switch of FIG. 1 also includes a collimating lens 42 disposed between fiber stack arrangement 12 and MEMS mirror assembly 14.

Figure 2:
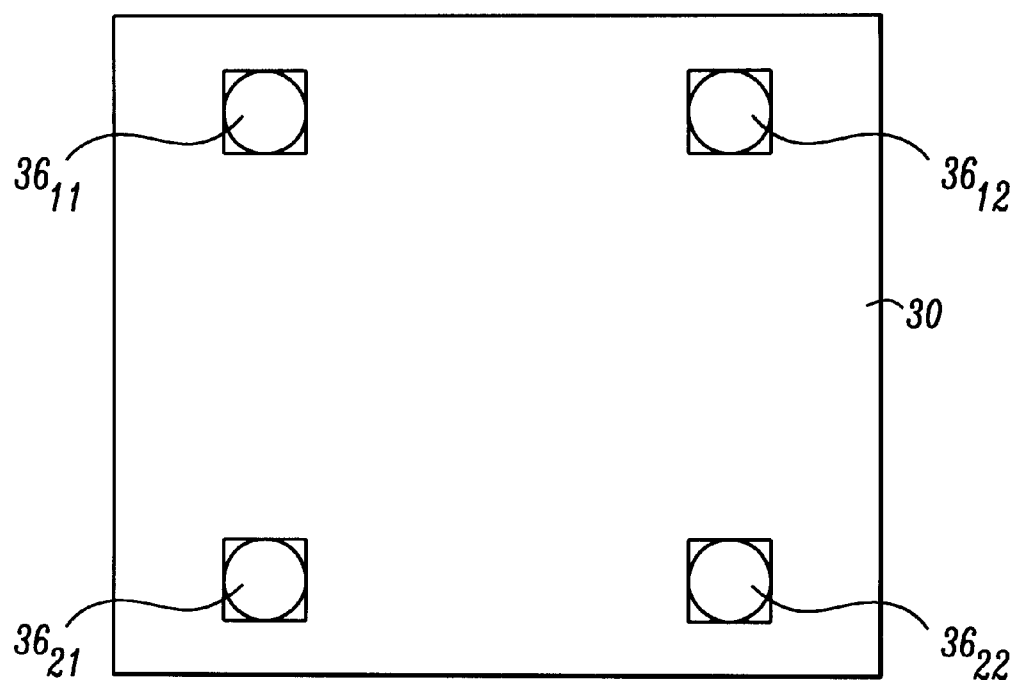
FIG. 2 is a top view of the fiber array arrangement of FIG. 1, illustrating the exemplary 2×2 switch design of the array.

As mentioned above, the fiber stack of the present invention is particularly well-suited when used with an M×N two-dimensional array of switch elements. FIG. 2 is a top view of an exemplary fiber stack for use with a 2×2 switch. Evident in this view is "top" substrate 30 of fiber stack arrangement 12, with a set of four separate spherical lenses $36_{11}$, $36_{12}$, $36_{21}$, and $36_{22}$ disposed as shown. Mechanical stops $40_{11}$, $40_{12}$, $40_{21}$, and $40_{22}$ can also be seen in this view.

Figure 3:
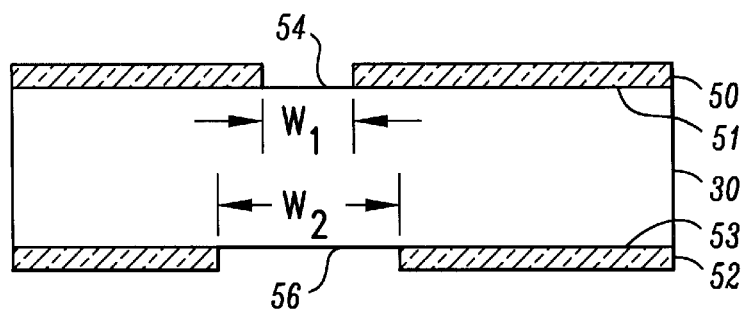
FIGS. 3–7 illustrate an exemplary set of processing steps for forming the fiber apertures and mechanical stops for a substrate used in the forming the fiber array of FIG. 1.
Figure 4:
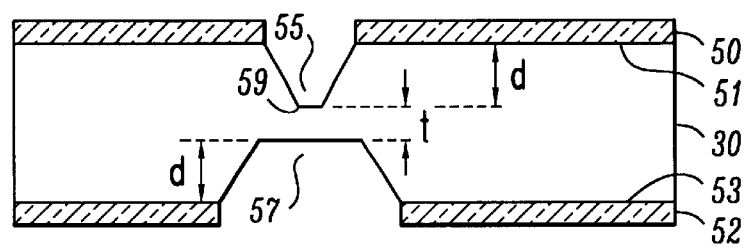
Figure 5:
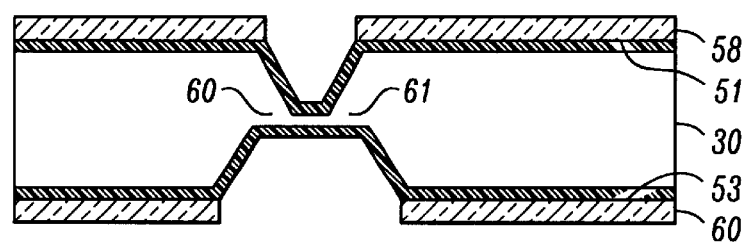
Figure 6:
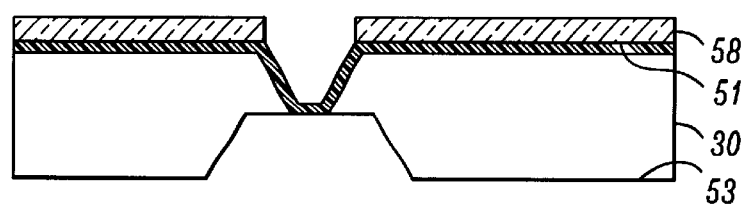
Figure 7:
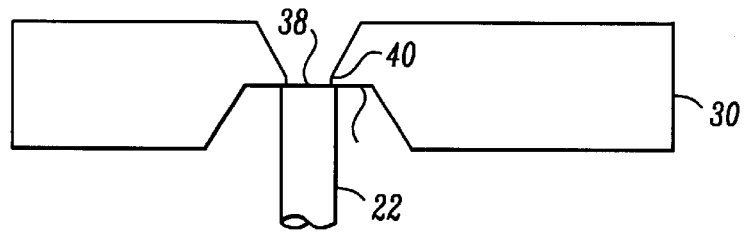

In the case where silicon is used as the substrate elements, a predefined fabrication process can be used to form mechanical stop 40 at the desired location within the particular substrate, in this case, substrate 30. FIGS. 3–7 depict a particular series of steps utilized with an exemplary substrate 30. Referring to FIG. 3, oxide layers 50 and 52 are first grown over top and bottom surfaces 51 and 53, respectively, of substrate 30. Oxide layers 50 and 52 are subsequently patterned and etched to expose the underlying silicon in windows 54 and 56, where window 54 comprises a width $w_1$ somewhat less than the width $w_2$ of window 56, the difference in width calculated to form the desired location of mechanical stop 40 (as will be evident from the subsequent processing operations). The structure as depicted in FIG. 3 is then etched for a predetermined period of time so as to form openings 55 and 57, as shown in FIG. 4, where each is formed to a depth d, leaving a relatively small thickness t of silicon therebetween. Referring to FIG. 5, a first oxide layer 58 is subsequently grown over top surface 51, as well as etched opening 55, of substrate 30. Similarly, a second oxide layer 60 is grown over both bottom surface 53 and etched opening 57. As is well-known in the silicon processing art, the formation of a thermal oxide layer involves the inward movement of the oxide at the silicon/oxide interface, as the underlying silicon is consumed. Advantageously, the remove of the silicon during this process results in rounding knife edges 59 and forming rounded corners 60, 61, as shown in FIG. 5. The rounded profiles of these areas thus reduces problems (e.g., damage to fiber) associated with knife edges. Second oxide layer 60 is subsequently removed, and via opening 57 further etched until first oxide layer 58 is reached, where first oxide layer 58 will act as a natural etch stop. The structure at this point in the process is illustrated in FIG. 6. Upon removal of the remaining oxide material, substrate 30 is configured as shown in FIG. 7. As shown, mechanical stop 40 for a fiber 22 is formed at the interface between the top and bottom etched regions, where the size of opening 62 is controlled so as to allow fiber 22 to be properly coupled to its associated lens element 36.

It is to be understood that the above-described embodiment of the present invention is exemplary only. In particular, the fiber stack arrangement of the present invention may be formed so support any suitable arrangement of fibers, an M×N two-dimension array being only one example. Linear arrays of fibers or, in general, any predefined fiber arrangement may be similarly supported by the stack of the present invention. Further, the substrate members of the fiber stack may be formed of materials other than silicon, including, for example, molded plastic materials. Additionally, various other types of alignment arrangements and alignment fiducial geometries may be used. For example, alignment grooves and ridges may be formed in the adjacent surfaces and interlocked to provide the physical attachment. Various other means will be apparent to those skilled in the art and are considered to fall within the spirit and scope of the present invention.

What is claimed is:
1. A MEMS optical switch comprising
    an array of micro-mirror switch elements disposed on a first assembly;
    a fiber array aligned with said array micro-mirror switch elements for coupling optical signals into and out of said array of micro-mirror switch elements; and
    a collimating lens disposed therebetween, wherein the fiber array comprises
        a plurality of separate substrate elements, each element formed to include a plurality of apertures disposed therethrough, the location of each aperture chosen so as to align with a separate micro-mirror of the associated array of micro-mirrors, such that when the plurality of separate substrate elements are stacked, the pluralities of apertures align to form openings for access of the plurality of optical fibers.

2. A MEMS optical switch as defined in claim 1 wherein in each substrate element includes alignment fiducials for providing physical alignment and mechanical attachment of the plurality of substrate elements when stacked.

3. A MEMS optical switch as defined in claim 2 wherein each alignment fiducial comprises a pyramidal detent formed in a surface of the substrate, with an alignment sphere disposed between adjacent pyramidal detents.

4. A MEMS optical switch as defined in claim 1 wherein the subassembly further comprises a plurality of spherical lens elements, each elements disposed at the exit of each aperture.

5. A MEMS optical switch as defined in claim 1 wherein the stack further comprises a mechanical stop formed within an aperture, said mechanical stop used to fix the location of an optical fiber endface with respect to the aperture exit.

6. An optical subassembly as defined in claim 1 wherein each substrate element comprises silicon and the apertures comprise etched vias formed therethrough.

* * * * *